United States Patent
Liang et al.

(10) Patent No.: US 10,329,154 B2
(45) Date of Patent: Jun. 25, 2019

(54) METHOD FOR PREPARING A PARTICULATE CATHODE MATERIAL

(71) Applicant: JOHNSON MATTHEY PUBLIC LIMITED COMPANY, London (GB)

(72) Inventors: Guoxian Liang, St-Hyacinthe (CA); Patrick Charest, Sainte-Julie (CA); Michel Gauthier, La Prairie (CA); Abdelbast Guerfi, Brossard (CA); Christophe Michot, Montreal (CA); Karim Zaghib, Longueuil (CA)

(73) Assignee: Johnson Matthey Public Limited Company, London, England (GB)

(*) Notice: Subject to any disclaimer, the term of this patent is extended or adjusted under 35 U.S.C. 154(b) by 129 days.

(21) Appl. No.: 14/567,220

(22) Filed: Dec. 11, 2014

(65) Prior Publication Data

US 2015/0158728 A1 Jun. 11, 2015

Related U.S. Application Data

(63) Continuation of application No. 12/517,990, filed as application No. PCT/CA2007/002236 on Dec. 7, 2007, now abandoned.

(30) Foreign Application Priority Data

Dec. 7, 2006 (CA) .................................... 2569991

(51) Int. Cl.
*C01B 25/45* (2006.01)
*B82Y 30/00* (2011.01)
(Continued)

(52) U.S. Cl.
CPC .............. *C01B 25/45* (2013.01); *B82Y 30/00* (2013.01); *C09C 1/00* (2013.01); *C09C 1/22* (2013.01);
(Continued)

(58) Field of Classification Search
CPC ...................................................... H01B 1/04
See application file for complete search history.

(56) References Cited

U.S. PATENT DOCUMENTS 6,855,273 B2  2/2005  Ravet et al.
8,273,481 B2  9/2012  Gauthier et al.
(Continued)

FOREIGN PATENT DOCUMENTS

CN  1478310 A  2/2004
EP  0824087 A1  2/1998
(Continued)

OTHER PUBLICATIONS

European Patent Office observations by a third party dated Dec. 2, 2016; Application No. 07855518.2.
(Continued)

*Primary Examiner* — William D Young
(74) *Attorney, Agent, or Firm* — BakerHostetler

(57) ABSTRACT

A method for preparing an electrode material, said material comprising complex oxide particles having a non-powdery conductive carbon deposit on at least part of their surface, said method comprising: grinding into nanometer size complex oxide particles or particles of complex oxide precursors, wherein the grinding is performed in a bead mill on particles dispersed in a carrier solvent, adding an organic carbon precursor to the oxide particles or oxide precursor particles before, during or after said grinding, and pyrolysing the mixture thus obtained, selecting the size of the particles to grind, the size of the beads used to grind, and the size of the resulting particles such that: 0.004<MS(SP)/MS(B)<0.12 and 0.0025<MS(FP)/MS(SP)<0.25, wherein MS(SP) represents the mean size diameter of the particles
(Continued)

before grinding, MS(FP) represents the mean size diameter of the particles after grinding, and MS(B) is the mean size diameter of the beads.

12 Claims, 12 Drawing Sheets

(51) Int. Cl.
| | |
|---|---|
| C09C 1/00 | (2006.01) |
| C09C 1/22 | (2006.01) |
| C09C 3/08 | (2006.01) |
| H01M 4/136 | (2010.01) |
| H01M 4/58 | (2010.01) |
| H01M 4/62 | (2006.01) |
| H01M 4/02 | (2006.01) |

(52) U.S. Cl.
CPC ............. *C09C 3/08* (2013.01); *H01M 4/136* (2013.01); *H01M 4/5825* (2013.01); *H01M 4/625* (2013.01); *C01P 2002/32* (2013.01); *C01P 2002/72* (2013.01); *C01P 2004/03* (2013.01); *C01P 2004/04* (2013.01); *C01P 2004/45* (2013.01); *C01P 2004/50* (2013.01); *C01P 2004/51* (2013.01); *C01P 2004/52* (2013.01); *C01P 2004/53* (2013.01); *C01P 2004/61* (2013.01); *C01P 2004/62* (2013.01); *C01P 2004/64* (2013.01); *H01M 2004/021* (2013.01)

(56) References Cited

U.S. PATENT DOCUMENTS

| | | | | |
|---|---|---|---|---|
| 8,377,509 B2* | 2/2013 | Dobbs | .................... | B82Y 30/00 427/212 |
| 2002/0195591 A1 | 12/2002 | Ravet et al. | | |
| 2004/0033360 A1* | 2/2004 | Armand | ................. | C01B 17/96 428/408 |
| 2004/0202934 A1 | 10/2004 | Zaghib et al. | | |
| 2006/0035150 A1 | 2/2006 | Audemer et al. | | |
| 2006/0257307 A1 | 11/2006 | Yang | | |
| 2007/0134554 A1 | 6/2007 | Armand et al. | | |
| 2009/0305132 A1 | 12/2009 | Gauthier et al. | | |
| 2010/0065787 A1 | 3/2010 | Armand et al. | | |
| 2010/0323245 A1 | 12/2010 | Liang | | |

FOREIGN PATENT DOCUMENTS

| | | |
|---|---|---|
| EP | 1702373 A1 | 9/2006 |
| EP | 1790617 A1 | 5/2007 |
| EP | 1850409 A1 | 10/2007 |
| JP | 2006032241 A | 2/2006 |
| JP | 2006261061 A | 9/2006 |
| JP | 2006302671 A | 11/2006 |
| WO | WO02/27823 A1 | 4/2002 |
| WO | WO 0227824 A1 | 4/2002 |
| WO | WO 2004008560 A2 | 1/2004 |
| WO | WO 2005062404 A1 | 7/2005 |
| WO | WO 2006000049 A1 | 1/2006 |
| WO | WO2006/120332 A1 | 11/2006 |
| WO | WO 2007100918 A2 | 9/2007 |

OTHER PUBLICATIONS

European Patent Office observations by a third party dated Dec. 16, 2016; Application No. 12156679.8.
Chen et al., "Reducing Carbon in LiFePO4/C Composite Electrodes to Maximize Specific Energy, Volumetric Energy, and Tap Density", Journal of the Electrochemical Society, 149 (9) A1184-A1189 (2002).
Huang et al., "Approaching Theoretical Capacity of LiFePO4 at Room Temperature at High Rates", Electrochemical and Solid-State Letters, 4 (10) A170-A172 (2001).
EP2012156679.8, Communication/Third Party Observations dated Oct. 20, 2017.
C.H. Mi, et al., "Effect of Sintering Time on the Physical and Electrochemical Properties of LiFePO4/C Composite Catahodes," Journal of Alloys and Compounds, 424 Jan. 25, 2006, pp. 327-333.
European Patent Application No. EP12156679.8, Communication Pursuant to Article 94(3) EPC dated Jan. 23, 2017.
European Application No. 20120156679, Communication Pursuant to Rule 114(2) EPC, Third Party Observation, dated Sep. 6, 2017.
S.Mende et al., Mechanical Production and Stabilization of Submicron Particles in Stirred Media Mills, Powder Technology, 132 (2003) 64-73.
K.Kim et al., Carbon Coatings With Olive Oil, Soybean Oil and Butter on Nano-LifFePO4, Journal of Power Sources 167 (2007) 524-528.
EP 070855518.2, Communication Pursuant to Rule 114(2) EPC, Third Party Observation, dated Jun. 20, 2017.
EP07855518.2-1373, EP Communication Pursuant to Rule 114(2) EPC dated Sep. 28, 2017.
Communication/Third Party Observations for EP2458666 dated Feb. 21, 2018.
Bridget Deveney, Kamen Nechev, Teymur Guseynov, Richard Jow, Kang Xu, Large Size Lithium Ion Cells Based on LiFePO4 Cathode Material, May 30, 2015 (downloaded of web page).
Claudio L. De Castro, Brian S. Mitchell, "Nanoparticles from Mechanical Attrition," Synthesis, Functionalization and Surface Treatment of Nanoparticles, Ed. by M.I. Baraton, American Scientific Publishers, Copyright 2002, Chapter 1, pp. 1-15.
Guoxian Liang, Michel Gauthier, Nathalie Ravet, Christophe Michot, Key elements on LiFePO4: performances, stability and availability, Phostech Lithium, presentation at ECS 210th Meeting Cancun, Mexico, Oct. 2006, 29 pages.
Naoki Hatta, Toshikazu Inaba, Development of Lithium Iron Phosphate Cathode Material for Lithium-ion Batteries, No. 188, Jun. 30, 2006, pp. 21-25.
Wolfgang Mutter, Ulrich Gerber, Comparison of Planetary Ball Mills, Idar-Oberstein, Germany, Jul. 25, 2005, pp. 1-4.

* cited by examiner

METHOD FOR PREPARING A PARTICULATE CATHODE MATERIAL

CROSS-REFERENCE TO RELATED APPLICATIONS

This application is a continuation of U.S. patent application Ser. No. 12/517,990 filed on May 12, 2010, which is a National Stage of International application PCT/CA07/02236 filed on Dec. 7, 2007, claiming the benefit of Canadian Patent Application No. 2,569,991, filed on Dec. 7, 2006.

FIELD OF THE INVENTION

The invention relates generally to a method for preparing particle compo-sitions, as well as the particles compositions obtained by said method, and uses thereof as electrode material.

BACKGROUND OF THE INVENTION

Lithium-ion batteries have known a phenomenal technical success and commercial growth since the initial work by. Sony in the early 90's based on lithium insertion electrodes essentially the high voltage cobalt oxide cathode invented by J. B. Goodenough and the carbon anode using coke or graphitized carbonaceous materials.

Since then, lithium-ion batteries have progressively replaced existing Ni—Cd and Ni-MH batteries, because of their superior performances in most portable electronic applications. However, because of their cost and intrinsic instability under abusive conditions, especially in their fully charged state, only small cell size and format have been commercialized with success.

In the mid 90's, Goodenough (See U.S. Pat. Nos. 5,910, 382 and 6,391,493) suggested that polyanionic phosphate structures, namely nasicons and olivines, could raise the redox potential of low cost and environmentally compatible transition metals such as Fe, until then associated to a low voltage of insertion. For example $LiFePO_4$ was shown to reversibly insert-deinsert lithium ion at a voltage of 3.45 V vs a lithium anode corresponding to a two phase reaction. Furthermore, covalently bounded oxygen atom in the phosphate polyanion eliminates the cathode instability observed in fully charged layered oxides, making an inherently safe lithium-ion battery.

As pointed out by Goodenough (U.S. Pat. No. 5,910,382 & 6,514,640), one drawback associated with the covalently bonded polyanions in $LiFePO_4$ cathode materials is the low electronic conductivity and limited Li+ diffusivity in the material. Reducing $LiFePO_4$ particles to the nanoscale level was pointed out as one solution to these problems as was the partial supplementation of the iron metal or phosphate polyanions by other metal or anions.

One significant improvement to the problem of low electronic conductivity of complex metal oxide cathode powder and more specifically of metal phosphate was achieved with the use of an organic carbon precursor that is pyrolysed onto the cathode material or its precursor to improve electrical field at the level of the cathode particles [Ravet (U.S. Pat. Nos. 6,963,666, 6,855,273, WO/0227824 and WO/0227823)].

It is also known to improve conductivity of a phosphate powder when used as a cathode material, by intimately mixing conductive carbon black or graphite powder with the phosphate powder or the phosphate precursors before synthesis Such addition of carbon blake or graphite powder involves usually relatively large quantities of C to achieve good connectivity and does not result in a good attachement of the C to the metal phosphate crystal stucture, said attachment being a characteristic judged essential to maintain contact despite volume variations during long term cycling.

Such recent improvements have led several battery manufacturers and users to undertake the development of safe mid to large size lithium-ion batteries based on transition metal phosphates cathode materials for use in portable power tools, Hybrid Electric Vehicle (HEV) and Plug-in HEV as well as for large stationary batteries for backup power and energy storage from intermittent sources.

Problems remain however to optimize the processability, cost and performance especially when power, energy arid cyclability are required simultaneously.

Composite electrode optimization, for example, requires short distances for Li+ diffusion in the solid state and the presence of an electronically conductive phase at the level of each nanoparticle of $LiFePO_4$. Manipulation and processing (coating and compacting) of elementary nanoparticles or their dispersion is more complex than manipulation and processing micron-size particles, given their large surfaces and low compaction. In the present text, nanoparticie means a particle having dimensions ranging from 5 nm to submicrons (defined as less than 1.0 μm), preferably between 20 and 600 nm that can be primary or secondary particles. A primary particle is made of a complex oxide. A secondary particle is an aggregate of primary particles, and may also contain other constituents such as internal or external C-deposit or carbon bridging or particulate carbon, other inert or conductive phases or sintering necks. A secondary particle may also have a porosity.

The present inventors found that the use of agglomerates of primary and secondary nanoparticles which are elaborated at a micron-size scale or larger (by spray drying for example), instead of elementary nanoparticles as such, facilitates ions and electron diffusion and the electrochemical reaction This is the result of using nano dimensions at the level of the active material nano particles while, benefiting from the ease of manipulating micron-size agglomerates.

As a general rule, electrochemical performance optimization of such agglomerates of nanoparticles or nanocomposite material requires a material having a high proportion of active metal phosphate, a low proportion of electrochemically inert conductive carbon and a controlled degree of open porosity of the agglomerates or the nanocomposite material. Furthermore, pore channel dimensions must be designed to allow solvated lithium's ion of the electrolyte to penetrate and reach elementary nano sized particles to support high charge or discharge rate currents.

Designing such agglomerates of nanoparticles or nanocomposite materials, as well as attaching efficiently nanolayers of conducting carbon to single or agglomerated nano particle internal or external surface becomes a challenge in order to avoid using too much dead weight carbon. The present invention addresses this problem at the level of presynthetised transition metal phosphates as well as at the level of the metal phosphate precursors.

It is known that metal phosphate agglomerated precursors have great impact on the structure and the properties of lithium metal phosphate final product (WO/0227824 and WO/0227823). For example, most of the commercially avai-lable $FePO_4, 2H_2O$ which is a precursor for $LiFePO_4$, is prepared by a wet chemistry process and has large dense aggregates having a mean particle size in the range of 40-200 μm and composed of fine elementary particles having a mean particle size in the range of 0.1-1 μm. Synthesis of lithium metal phosphate using large agglomerated particle precursors requires long sintering times and sometimes leads to large particle size, sintered material and impurity phases due to incomplete reaction between the reactants.

Pre-synthesis grinding of FePO4.2H2O by jet milling can reduce the size of secondary particles to micron size, for example D50 at 2 μm and D100 at 10 μm. The electrochemical performance of a carbonated Li—Fe-phosphate (designated by LiFePO4/C) can be significantly improved by using air jet milled FePO4.2H2O precursor. However, sintering still occurs inside the large agglomerates and leads to limited power capability of an electrode made of said LiFePO4/C.

It is known that when organic carbon precursors are used in the process for preparing Li metal phosphate materials, the non-agglomerated nanosize FePO4.2H2O particles used as the precursor remain un-agglomerated even at the optimized synthesis temperatures required to obtain lithium metal phosphate. In contrast, dense or close porosity large particles made of agglomerates or aggregates tend to sinter to a large degree even when an organic precursor is used (WO/0227824 and WO/0227823). Such dense and large particles made of agglomerates or aggregates lower the rate performance of the final products because of low Li+ diffusion and/or lack of conductive carbon inside the particles.

It is therefore a critical step to prepare the metal phosphate precursor so as to achieve non agglomerated and well dispersed fine particles in the nanometer and sub-micron range before sintering synthesis. In another aspect of the invention, it is also possible to create precursor agglomerates having the right structure, porosity and carbon precursor localization from said well dispersed nano particles in order to design optimized agglomerates of nanoparticles or nanocomposites of the final product. There are many ways and technologies available to obtain non-agglomerated tine particles depending on the physical properties of the available metal phosphate. For examples, if the metal phosphate is not made of hard agglomerates or aggregates, ultrasounds can be used to break the secondary particles and disperse the elementary particles or smaller agglomerates and stabilized the liquid suspension of those by using and organic stabilizer or dispersant. Grinding or comminuting is one of the most used processes allowing the production of fine particles and/or to de-agglomerate. More recently, industrial ultra fine wet grinding equipment have been made available commercially that can be used to reduce particle size down to 10 to 20 nm. However, with time the nano particles tend to re-agglomerate due to strong van der Waals interaction or electrical double layer interaction.

Various processes have been used to make lithium metal phosphate or carbon-coated lithium metal phosphate materials. One of them is solid state reaction of various precursors under reducing or inert atmospheres. Depending on the nature and particle size of the reactants, various reaction temperatures and times are required to achieve high purity lithium metal phosphate. In most cases, the reaction temperature required to achieve complete reaction is high and is accompanied with sintered aggregates or sintering necks.

Wet chemistry methods like co-precipitation and sol-get synthesis have been widely investigated to make homogeneous sintering precursors at atomic scale and in principal, a low pyrolysis temperature is needed to achieve fine particle size of final products. However, in practice, a segregation of reacting species occurs, and then long reaction times or higher reaction temperatures are required to achieve high crystallinity and high phase purity. In consequence, the particle size and particle morphology are complex to control.

Hydrothermal reaction is one of the most elegant methods to synthesize lithium metal phosphate. The lithium metal phosphate particles with various well controlled particle sizes and morphologies under moderate hydrothermal conditions can be made. Depending on the precursors and hydrothermal conditions, various particle size and shapes have been reported such as submicron size ellipsoids, micron size hexagonal plate and heavily agglomerated nanospheres or nano-rods. Difficulties are often associated with the control of stoichiometry, crystallinity, phase purity and particle size.

In many of the processes reported so far, difficulties associated with the control of particle size, phase purity and carbon coating are the bottleneck to scale up the process. To avoid abnormal particle growth, a low sintering temperature is required. On the other hand, to achieve high phase purity and high carbon conductivity, a higher sintering temperature is desired. It is difficult to achieve all optimized parameters in one single synthesis step.

In an earlier work the applicants have also developed a low cost synthesis process to prepare a phosphate cathode material which has been patented (See WO 2005/062404) but said process results in solid crystalline ingots or micron size powders as made by conventional grinding process.

Grinding or comminuting is one of the most used processes allowing the production of fine particles and/or to de-agglomerate in ceramic and paint industries. More recently, industrial wet nanogrinding bead mill equipment have been made available commercially, that can be used to reduce particle size down to 10 to 20 nm (See for example WO 2007/100918 for lithium metal phosphate ultrafine grinding).

During wet nanogrinding in isopropyl alcohol solvent, preliminary experiments on pure LiFePO4, obtained from a melt process, inventors were drawn to conclusion that such mechanical treatement present deleterious effects that affect the use of said pure LiFePO4 as a cathode material. Indeed, after nanogrinding LiFePO4 in the range of 20-30 nm, only a 4% reversible capacity was realized in a lab-cell instead of the expected >80% as shown and discussed in a following example. After that point, it was concluded that wet nanogrinding a lithium metal phosphate was altering the product. However, when nevertheless a batch of this nano-ground LiFePO4 was subsequently heat treated and used for a pyrolysis carbon-deposit experiment the inventors surprinsigly discovered that electrochemical properties of such carbon-deposit LiFePO4 were restored as 94% of the reversible capacity was realized. This unexpected effect of a deterioration of pure LiFePO4 by wet nanogrinding followed by restauration of electrochemical properties through thermal treatment and carbon deposition by pyrolysis is a main object of the present invention as well as the use of different organic surfactants, adsorbant and carbon precursors that facilitate the wet grinding process and that are converted to non contaminating and conductive carbon to make and optimize the C deposited nano particle or nano-structured lithium metal phosphates particle or agglomerates.

The present invention provides a method for preparing carbon-deposited cathode nano materials, including a from molten lithium metal phosphates process and ingots in an easy way and resulting in a high performance cathode material.

SUMMARY OF THE INVENTION

In one aspect, the present invention provides a method for preparing a complex oxide particle composition, wherein the complex oxide particles have a non powdery conductive carbon deposit on at least part of their surface. The method comprises nanogrinding complex oxide particles or particles of complex oxide precursors, wherein:
- an organic carbon precursor is added to the oxide particles or oxide precursor particles before, during or after nanogrinding, and pyrolysing the mixture thus obtained;
- a stabilizing agent is optionally added to the oxide particles or oxide precursor particles before, during or after nanogrinding;
- the nanogrinding step is performed in a bead mill on particles dispersed in a carrier liquid, and;
- the size of the particles to nanogrind, the size of the beads used to nanogrind, and the size of the resulting particles are important process characteristics and are selected such that:

$0.004 < MS(SP)/MS(B) < 0.12$, $0.0025 < MS(FP)/MS(SP) < 0.25$ wherein MS(SP) represents the mean size diameter of the particles before grinding (starting particles), MS(FP) represents mean size diameter of the particles after grinding (final particles), and MS(B) is mean size diameter of the grinding beads.

As a very empiric rule, optimizing can be started with a D90 (SP) to (B) ratio of 1/10, and a (B) to D90(FP) ratio of 1000. A preferred mean size of beads ranges from 100-500 µm.

In another aspect, the invention provides a particle composition. The particle composition comprises particles having a complex oxide core and a conductive carbon deposit on at least part of the surface of the core, wherein:
- the particles comprise nanoparticles having a nanoscale size and agglomerates of nanoparticles having a submicron to micron scale particle size;
- said conductive carbon deposit is a non powdery deposit, and is present on at least part of the surface of the elementary particles and of the surface of the agglomerates.

In a further aspect, the invention is related to the use of the particle composition as an active electrode material, a nanocomposite electrode material comprising said particle composition as the active electrode material, and an electrochemical cell wherein at least one electrode comprises said nanocomposite electrode material.

DETAILED DESCRIPTION

Figure 1:
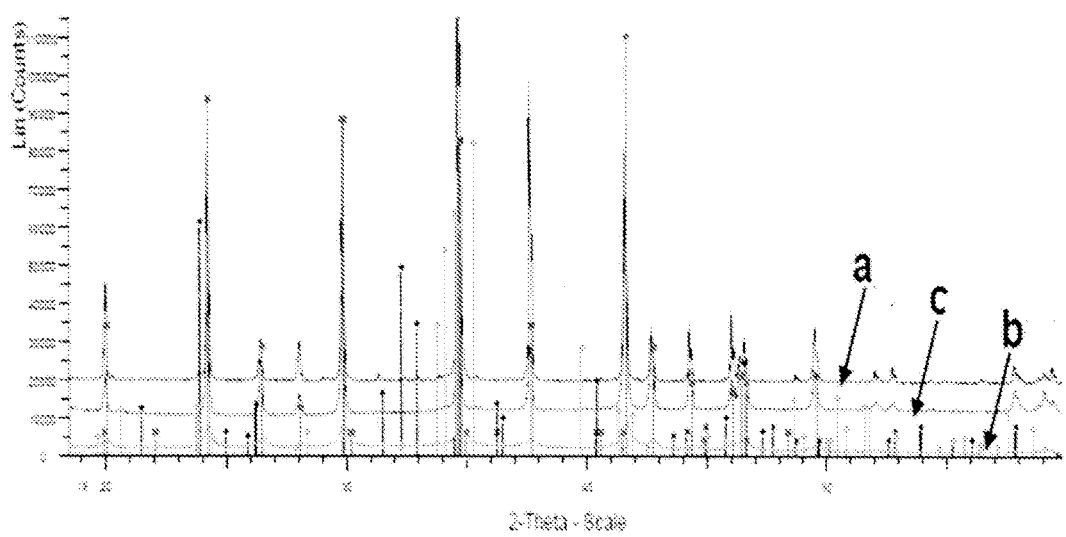
FIG. 1 illustrates the XRD pattern for molten LiFePO4 powder before nanogrinding (a), after nanogrinding in IPA (b) and after thermal treatment and pyrolysis (c).

The method of the present invention is particularly useful for the preparation of a particle composition wherein the complex oxide is at least one compound having an olivine structure and formula AMXO4 wherein:
- A is Li, optionally partly replaced with not more than 10 atomic % Na or K;
- M represents FeII or MnII, optionally partly replaced with not more than 50 atomic % of at least one metal selected in the group consisting of Fe, Mn, Ni et Co, and optionally replaced with not more than 10 atomic % of at least one aliovalent or isovalent metal different from Fe, Mn, Ni or Co;
- XO4 represents PO4, optionally partly replace with not more than 10 mol % of at least one group selected from SO4 and SiO4.

In a specific embodiment, the aliovalent or isovalent metal different from Fe, Mn, Ni or Co in the complex oxide is at least one metal selected from the group consisting of Mg, Mo, Nb, Ti, Al, Ta, Ge, La, Y, Yb, Sm, Ce, Hf, Cr, Zr, Bi, Zn, Ca et W.

Complex oxides LiFe1JVInxPO4, $0 < x \leq 0.5$, LiFePO4 and LiMnPO4 are particularly preferred.

These lithium transition metal phosphates are all of the olivine structure and tend to behave similarly mechanically upon grinding, especially when made by a melting process.

Furthermore, the method of the present invention is useful to prepare a particle composition wherein the complex oxide is a titanate which has a spinel structure and the formula AaMmOoNnFf wherein A represents an alkali metal; M represents Ti alone, or Ti partly replaced with another metal, preferably a transition metal; a>0, m>0, o>0, n>0, f>0, and coefficients a, m, o, n and f are selected to provide electroneutrality of the complex oxide.

A is preferably Li, optionally partly replaced with another alkali metal.

In a prefered embodiment, the titanate is of formala $Li_{4+x}Ti_5O_{12}$ or $Li_{4+X-^{\wedge}}Mg_xTi_5O_{12}$, wherein 0<x et y<1, preferably $LiTi_5O_{12}$ The conductive carbon precursor is preferably a low viscosity, optionally crosslinkable, polymerizable, or polycondensable compound which is able to wet, penetrate and adsorb on reconstituted agglomerates of nanoparticles of the precursors or the complex oxide. The carbon precursor may be any liquid, solid (in solution) or gaseous organic compound that leaves carbon upon pyrolysis. It can combine different functionalities (surfactant, self adsorbing, lubricant, catalyst, for example) and consist in one or several products. The conductive carbon precursor is preferably intimately mixed with the complex oxide particles or the complex oxide precursor particles, in order to achieve impregnation of the nanoparticle surface and of the agglomerates of nanoparticles, so that after pyrolysis, the carbon deposit is in intimate contact with the complex oxide.

The method of the invention preferably comprises a further step which is performed after grinding and before pyrolysis, said further step comprising conditioning the reaction mixture in order to adsorb the carbon precursor on the complex oxide precursors or on the complex oxide, or to polymerize or cross link a carbon precursor which is monomer. The method may also comprise a further step consisting in aggregating the reaction mixture comprising the carbon precursor and the complex oxide precursor after grinding. Aggregation can be performed by flocculating, by spray drying, or by charge effect, In a preferred embodiment, the method of the present invention comprises the following steps:

Grinding or de-agglomerating a complex oxide or complex oxide precursors to nano size or sub-micron size in the presence of an Organic Precursor (OP) that might include a surfactant or not.

Adsorbing and distributing OP on the external surface of elementary particles to stabilize their dispersion or on the external and internal surface of the particles of the agglomerates to distribute the future C deposit through its precursor before, during or after grinding.

Pyrolysing the reaction mixture to convert the adsorbed and localised OP to C before, during or after final phosphate synthesis, when a phosphate precursor is used.

Alternatively similar pyrolysis treatment can be done after synthesis and grinding to obtain similar electrochemically active electrode material, i.e., nanosized metal phosphate on which a conductive carbon deposit is attached to the crystal structure.

In one embodiment, the method provides a particle composition, starting from compounds which are precursors for the complex oxide $LiMPO_4$. In this embodiment, an organic stabilizing agent is preferably added to the suspension of initial particles before grinding. The organic stabilizing agent modifies the surface charge and increases the repulsive force between particles to counter the Van der Waals force. Thus, the dispersion is stabilized and the degree of agglomeration of nanoparticles is controlled.

The inventors demonstrated that precursors of the complex oxide can be nanoground together with the carbon precursor to directly obtain a particle composition according to the invention having high level size and shape properties, wherein said size and shape are substantially similar to those of the nanoground precursor particles. The attached examples demonstrate that nanogrinding is easier to perform on precursor particles than on complex oxide particles, possibly because of the presence of the carbon precursor which might have a tensio active effect and which adsobs on the others precursors.

The organic stabilizing agent can be selected from organic electrostatic or electrosteric stabilizers, surfactants, dispersant agents and encapsulant agents, many of them being available commercially.

The organic stabilizing agent is preferably selected from compounds which, upon grinding or pyrolyzing, do not generate side effects such as highly toxic gas or compounds which would be detrimental to the performance and cyclability of an electrochemical cell comprising the particle composition of the invention.

The organic stabilizing agent may additionally act as a precursor for the conductive carbon, depending on its carbon content.

The Li precursor may be selected from lithium salts such as $Li_2CO_3$, $LiOH$, $LiH_2PO_4$, $Li_3PO_4$ for example.

The Fe (or equivalent Mn analogs) precursor may be selected from $FePO_4$ $nH_2O$, $Fe_3(PO_4)_2nH_2O$, iron sulphate, different iron oxides or hydroxides, iron salts of inorganic and organic compounds.

The P precursor may be selected from derivatives of phosphoric acid or $P_2O_5$ or mono or di ammonium acid phosphate salts or salts that combining phosphates or polyphosphates with the Li or Fe precursor.

Some of the aforementioned compounds can be used as the precursor for more than one element.

When the particle composition of the present invention is prepared starting from complex oxide precursor particles, pyrolysis to convert the adsorbed organic carbon precursor to conductive carbon can be performed before, or during the synthesis of the complex oxide.

In one embodiment, the method provides a particle composition, starting from complex oxide $LiMPO_4$ particles. In this embodiment, the carrier liquid is preferably a reactive liquid, selected from water or alcohol [ for example isopropyl alcohol (IPA) or butanol].

The complex oxide can be prepared by well known prior art method, for instance by a solid state reaction of precursors under reducing or inert atmosphere if M is Fe, or in oxidizing atmosphere (for instance ambient air) when M is Mn, by co-precipitation or sol-gel synthesis, or by a hydrothermal reaction. The particle size of the particles before grinding is preferably in the range from 1 μm to 50 μm. The complex oxide can also be prepared by reacting the precursors in molten state in an inert or reducing atmosphere, the complex oxide being pre-ground after synthesis and solidification.

A particle composition according to the present invention comprises particles having a complex oxide core and a conductive non powdery carbon deposit. The particles comprise elementary nanoparticles and micron size agglomerates or aggregates of elementary nanoparticles.

Elementary nanoparticles have dimensions ranging from 5 nm to 1.0 μm, preferably between 10 and 600 nm and comprise primary nanoparticles and secondary particles.

A primary nanoparticle is made of a complex oxide with or without C.

A secondary particle is an agglomerate or an aggregate of primary particles, and may also contain other constituents such as internal or external C-deposit or carbon bridging or particulate carbon, other inert or conductive phases or sintering necks. A secondary particle may also have a porosity.

An "aggregate of elementary nanoparticles" herein means a micron-size assembly of elementary nanosize particles held together by physical or chemical interaction, by carbon bridges, or bridges of locally sintered complex oxide containing a minimum degree (0-30%) of internal open porosity and carbon deposit. An "agglomerate" means an assembly of particles loosely held together by low forces. Agglomerates are formed continuously during the grinding process, during which there is a balance between comminution and re-agglomeration. The method of the invention allows changing the balance by the use of surfactants, by varying the milling conditions or by adsorbing or encapsulating the carbon precursor on the elementary nanoparticles. When adsorbing or encapsulating the carbon precursor on the elementary nanoparticles, the elementary nanoparticles are encapsulated by the carbon precursor, aggregates are formed using the precursor to bond elementary nanoparticles, said bonds being converted upon pyrolysis to carbon or sintering neck to form aggregate particles which are like bigger elementary particles. When agglomeration of elementary nanoparticles is formed faster or before the surfactant or precursor can penetrate into the agglomerate and this agglomerate is treated during pyrolysis, one can observe an important sintering of the elementary nanoparticles agglomerates into larger particles that is only carbon deposited on the surface.

The conductive carbon deposit is attached to the complex oxide crystal structure in the form of nanosize layers of carbon, preferentially of graphitized or "graphene" carbon. "Carbon deposit attached to the complex oxide" means that there is an intimate contact through physical or chemical bonding between the complex oxide crystal and the carbon deposit. It is believed but not limitatively, that the pyrolysis mechanism involves radical formation, and gaseous species can result in chemical as well as in physical bonding between the sp3 C and the PO4 entity. Such an attached carbon deposit is used not only to induce conductivity and homogeneity of the electrical field of the particles, but also to partially or totally avoid extremely favourable nano particle sintering. When the amount of carbon deposit is high enough and covers most of the surface of the complex oxide particles, it may achieve interparticle bounding by carbon bridges. When only part of the surface of the complex oxide is covered by the carbon deposit, it allows local sintering of the complex oxide nanoparticles, providing bonded agglomerates of nanoparticles having an open pore structure, which allows solvated lithium penetration into the micron size agglomerates.

It has been found that the organic carbon precursor pyrolysis mechanism in contact with transition metal of the complex oxide allows the growth of at least partially graphitized layers on the complex oxide crystal in a mechanism that might, although non limitatively, involve a gas phase mechanism of carbon growth. The nature, ratio and localization of the carbon deposit can be controlled by selecting the appropriate organic precursor, by the mechanism of adsorption of the carbon precursor on the surface of the complex oxide particle or the complex oxide precursor particle, and by pyrolysing on the external surface of the elementary nanoparticles or on the internal or the external surface of the agglomerates. The thickness of the carbon deposit is selected depending on the application It can be between a few nm and a few tenth of nm, (for instance 0.5 nm-50 nm) thus requiring very low weight ratio carbon/ complex oxide (for instance 0.5 to 10%, preferably 1 to 5%) in order to achieve an efficient electronic conduction by the carbon film (in case of a continuous deposit or by short distance tunnelling mechanism (in case of a discontinuous deposit or on a particulate deposit.

The particle composition of the present invention can be used as an active material for an electrode. An electrode according to the present invention comprises a nanocomposite material applied on a current collector, said composite material comprising said particle composition, pores, a binder and and optionally an agent providing electronic conductivity.

In a particle composition of the invention to be used as an active material for a cathode, the complex oxide is preferably a LiMXO4 oxide. In, a particle composition to be used as an active material for an anode, the complex oxide is preferable a titanate.

In an embodiment, the nanocomposite material comprises a particle composition of the invention, wherein at least 50% of the elementary nanoparticles have a size between 5 nm and 900 nm diameter, preferably between 10 nm and 300 nm, said nanoparticles being not agglomerated or sintered. It is pointed out that, if the particle composition is prepared from precursors of the complex oxide, the method of the invention produces particles which have substantially the same dimension and shape as the precursor particles, if the starting material is made of precursors of the complex oxide.

In another embodiment, the nanocomposite material comprises a particle composition of the invention, wherein the elementary nanoparticles are agglomerated to form aggregates having a size from 0.2 µm and 10 µm, preferably from 0.5 µm to 5 µm.

In another embodiment, the conductive carbon deposit attached to the complex oxide crystal structure on at least part of the surface of the nanoparticle has a nanoscale thickness.

In another embodiment, the conductive carbon is present on part of the surface of the complex oxide nanoparticles, and the nanoparticles are sintered at the complex oxide surface thereof.

In another embodiment, where the major part of the surface of the complex oxide nanoparticles is covered with the conductive carbon deposit, the nanoparticles are aggregates via carbon bridges.

In another embodiment, the nanocomposite material further contains at least a binder or an electron conduction additive. The binder is preferably a fluorinated or partially fluorinated elastomer, water or an organic soluble or dispersable binder including latex, or SBR The electron conduction additive, is preferably selected from the group consisting of carbons, carbon blacks, conductive polymers and graphite, intermetallic or metallic powder, fibers or platelets. Nanoparticles of other cathode materials might also be included.

In a further embodiment, the particle composition of the nanocomposite material comprises secondary particles and or agglomerates of elementary nanoparticles and has an open porosity, the volumetric fraction of the pores ranging from 0.30 to 0.05, preferentially from 0.2 to 0.1.

In another embodiment, the conductive carbon deposit is at least partly graphitized carbon obtained by pyrolysis of an organic carbon precursor that contains elements such as N, P, Si that can be covalently bound to carbon.

The process of the invention to make nano-sized particles or agglomerates themselves coated at a nanoscale with conductive carbon makes such molten process viable for high power cathode materials.

The present invention addresses the preparation and optimisation of complex oxide-carbon cathode materials in which a conductive carbon is chemically fixed to the complex oxide crystal structure by pyrolysing an organic carbon precursor that is in intimate contact with nanoparticles or with nanocomposite aggregates of the complex oxide or the complex oxide precursor, preferably by an adsoption process or a chemical linkage process.

An appropriate selection of the amount, nature, thickness and distribution of said carbonaceous deposit can be used to control the characteristics of the particle composition of the invention. For example, nanoparticle sintering can be avoided while leaving open porosity between nanoparticles in the aggregates, or on the contrary, partial bridging between nanoparticles of agglomerates can be provided by allowing local interparticle sintering necks to form or by creating inter nano particle carbon bridges, or by selecting in order to allow inter nano particle partial of the aggregates or to establish carbon bridges.

In one preferred mode of realization, the nanoparticle suspensions are obtained by micromedia bead mill grinding or deagglomeration of a suspension of solid particles of the complex oxide or of the complex oxide precursor in a liquid media.

The wet grinding device may be selected from bead mills that can reduce the particles size down to nanometer range. Particularly, mention may be made of Ultra APEX Mill by Kotobuki Industries Co. Ltd of Japan, High speed Netzsch Zeta agitator bead mill by Netzsch of Germany, Hosokawa Alpine AHM mill by Hosokawa of Japan, and MicroMedia® P1 & MicroMedia® P2 bead mill by Büehler of Switzerland. The grinding beads. may be made of alumina, zirconia or carbides for example.

The organic carbon precursor is preferably selected from organic compounds which are able to form conductive carbon deposit upon pyrolysis in the presence of the complex oxide or precursors thereof, and to wet, impregnate, encapsulate and preferably adsorb and/or self-organize on at least part of the surface of the complex oxide or its precursor in order:
  to stabilize the nanoparticle dispersion
  to help controlling the re-agglomeration or aggregation of the complex oxide or the precursor thereof during or after the grinding/desagglomeration step in solution or during spray/evaporation techniques.
  to leave by pyrolysis a carbon deposit localized on the surface of the nanoparticles or on the external or internal surface of the agglomerates or aggregates of nanoparticles
  to create C bounding between elementary particles or complex oxide hounding between elementary particles to form micron size aggregates or nanocomposites.

The organic carbon precursor is advantageously selected from crosslinkable monomers or oligomers, polymers, copolymers (especially block copolymers) and high carbon content surfactants. However liquid organic compounds in solution or solid organic compounds are also possible. The organic precursor can combine more than the C-source function and can also be selected to act as a surfactant, a stabilizer etc.

Numerous products commercially available can be used as the organic stabilizing agent. They includesurface active agents (also known as surfactants) It is an important aspect of the invention to use low-cost and registered stabilizers. Most of these organic compounds are amphiphilic products containing an hydrophilic part which is ionic or non-ionic, and hydrophobic part allowing modification of particle/solvent surface tension, wettabiiity and more efficient dispersion of the particle in the carrier liquid. These products and mixtures thereof are often characterized by their HLB number corresponding to balance between hydrophobic and hydrophilic moieties. A large set of possible surfactant is provided in Stepan Global Product Catalog incorporated herein by its reference. Many others are available from worldwide specialty chemicals manufacturers.

The surfactant may be selected for example from fatty acid salts (for example oleic acid or lithium oleate), fatty acid esters, fatty alcohol esters, alkoxylated alcohols, alkoxylated amines, fatty alcohol sulfate or phosphate esters, imidazolium and quaternary ammonium salts, ethylene oxide/propylene oxide copolymer, ethylene oxide/butylene oxide copolymer and from reactive surfactants.

The fatty acid esters surfactants can be prepared through esterification. Numerous cost-effective combinations exist, allowing for fine-tuning of surfactants properties in terms of solubility/insolubility in various solvents, dispersibility of submicron or nanosize complex oxide cathode material. A major advantage of using fatty acid esters is that they can be used as a carbon precursor which provides a high quality carbon deposit generated upon pyrolysis of the fatty acid chains. Non-ionic fatty acids are mainly obtained by esterification of a fatty acid with glycol products (glycerol, glymes, . . . )—The carbonization ratio depends on the fatty acid content, the surfactant and the fatty acid weight. To avoid low carbonization ratio and generation of a large amount of ashes during carbonization process, fatty acid with molecular weight>250 are preferred. Mention may be made of caprylate, undecylenate, palmitate, laurate, myristate, oleate, ricinoleate, linoleate, linolenate, and stearate. Oleate, stearate, linoleate, linolenate, and ricinoleate are preferred, more particularly oleate and stearate, if handling/safety is considered. If a high carbonization ratio is a concern, glycerol monooleate or monostearate are of particular interest. With a fatty acid containing the same amount of carbon, the presence of insaturation modify the solubility properties. For example, glycerol monooleate is soluble in isopropyl alcohol (IPA) whereas glycerol monostearate is poorly soluble. Lower solubility of glycerol monostearate is also of interest when such compounds are processed with high-shear mixing, especially in bead mills according to the method of the invention. Such high-energy mixing will allow efficient and homogeneous dispersion in IPA of low-solubility glycerol monostearate which is further stabilized by adsorption on complex oxide particles. Optimization of surfactant formulation is also easily obtained by esterification of fatty acid with glyines to produce surfactants such as the following oleate derivatives Ci7H33-COO(CH2CH2O)2OH or C17H33-COO(CH2CH2O)9OOC—C17H33.

Length of the glyme part and choice of the fatty acid allow preparation of surfactant with suitable HLB value and desirable inciting point, boiling point, solubility/insolubility, wettability in carrier solvent in view to obtain high quality carbon coating after pyrolysis. An important point to consider from an industrial perspective is that optimization of formulation is done at almost constant cost of an already cost-effective solution.

Some derivatives of fatty acid are also of particular interest. First of all, sugar-ester compounds composed of an hydrophilic sugar part, especially sucrose, sorbitol and sorbitan, an hydrophobic fatty acid part, and optionally a polyethylene oxide segment depending on the desired HLB value. For example, mention can be made of the Tween® surfactants produced by Uniquema, and especially Tween® 80 and 81 (polyoxyethylenesorbitan monooleate), or Tween® 85 (polyoxyethylenesorbitan trioleate), Polyoxyethylene sorbitol hexaoleates are also important surfactants.

Tall oil obtained as a by-product of wood pulp manufacture is also an interesting source of fatty acid derivatives, especially grades obtained after fractional distillation tall oil rosin and by further distillation tall oil fatty acid which is a low cost, consisting mostly of oleic acid, source of fatty acids. Tall oil and tall oil fatty acid are available from numerous supplier (for example Arizona Chemical) including in the form of ester with glycerol or glymes.

As carbonization ratio depends on molecular weight/boiling point of fatty acid, it is also of particular interest to use fatty acid oligomers obtained from unsaturated fatty acid (oleate, linoleate, . . . )—For example, mention can be made of the Unidyme® fatty acid oligomers available from Arizona Chemical. Dimerized product, especially dimerized oleic acid, used in the form of polyamide in ink industry are also of interest and are produced for example by Henkel or Arizona Chemical.

In a particular embodiment, a fatty acid salt of a transition metal cation is used as the surfactant and the organic carbon precursor, and the carbon deposit which is generated by pyrolysis is in the form of carbon nanotubes. The transition metal cation acts as a catalyst for the nanotube formation. The transition metal is preferably selected from Ni, Co or Fe. The fatty acid contains preferably at least 6 carbon atoms, more preferably at least 10 and most preferably 14. The fatty acid is preferably selected from stearate, oleate, linoleate, linolenate, ricinolenate, preferably oleate and stearate. The use of nickel stearate as a precursor for carbon in the form of nanotubes precursor is described for example in J. Mater. Chem., 2005, 15, 844-849, which. By a proper choice of the fatty acid of the fatty acid salt of a transition metal, the solubility of said salt can be easily adjusted to suitable solvent carrier.

Alcoxylated alcohols may be selected from those which are obtained from ethylene oxide and/or propylene oxide. Most common alcohol precursors are fatty alcohols and alkyl-phenols (for example octyl or nonylphenol), especially the alkoxy alcohols available under the trade name Igepal®, from Rhodia Inc or Brij® surfactants. Alkoxy lated amines are provided by Huntsman under the trade names Jeffamine® and Surfonamine®. Surfonamine® is an EO/PO amine of particular interest as dispersant and carbon precursor, the PO part allowing carbon generation during pyrolysis.

Fatty alcohol sulfate or phosphate esters, including their zwiterrionic form, are available for example from Stepan Company. In the method of the present invention, the phosphate esters are preferred. Special attention should be drawn to the styreneoxide-based phosphorylated polyether available form Degussa and of the following formula.

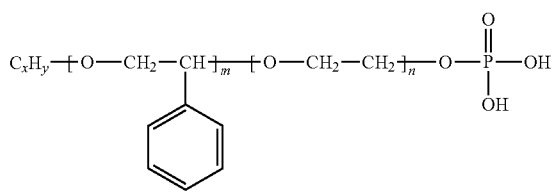

Imidazolium and quaternary ammonium based surfactants are available from Degussa under the trade name Tego Dispersant, for example the compounds of followings formulae

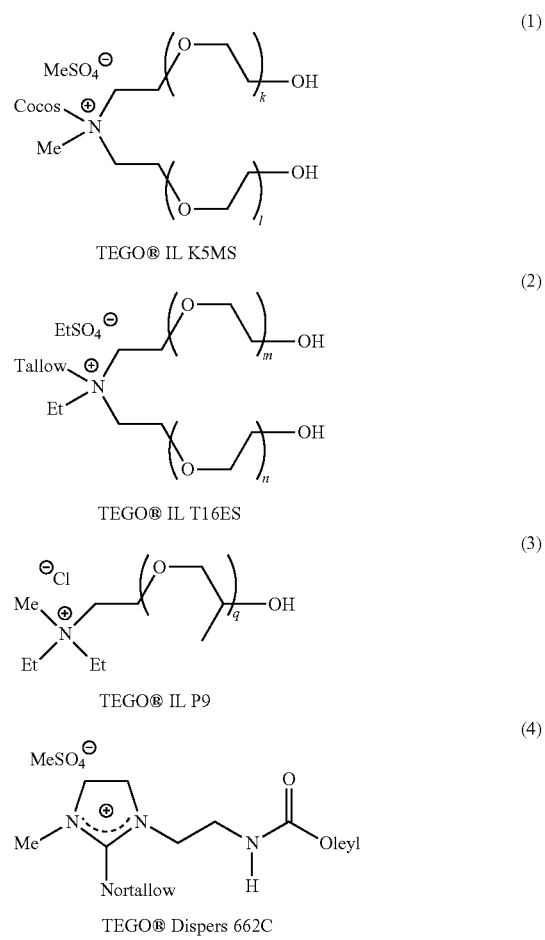

Ethylene oxide/propylene oxide copolymer surfactants are mainly known as Pluronic®, the poly oxypropylene part allowing carbon generation during pyrolysis (see for example *Chem. Commun.*, 2003, 1436-1437). Modification of the EO/PO ratio and of the molecular weight provides a large choice of cost-effective tensio-active agents with tunable properties in terms of solubility, surface-tension, wettability, and carbonization ratio. Important physico-chemical data on the Pluronic® products is provided by BASF on http://www.basf.com/performancechemical/bcperfdata_tables.html.

Polyanhydride resins obtained by alternate copolymerization of maleic anhydride with an alkylene are also an important class of compounds effective as surfactant and/or carbon precursor. Of particular interest is poly(maleic anhydride-alt-1-octadecene) produce by Chevron Phillips Chemical Company. This high molecular weight polymer is soluble in IPA due to esterification of anyhydride part by isopropanol.

As IPA is an important solvent in the method of the present invention, mention be also made of use of alkylated sucrose, especially sucrose acetate isobutyrate produce by Eastman. Polyvinyl butyrals IPA soluble polymers available form Wacker under the trade name Pioloform® can also be used as surfactant and/or carbon precursors.

Reactive surfactants so called "Surfmer", are non-ionic, cationic and anionic compounds (see Acta Polym 95, 49, 671). "Reactive surfactant" means a surfactant to containing a polymerizable group through anionic, cationic or radical polymerization (for instance an epoxyde, allyl, vinyl, acrylate, methacrylate, vinylether, or maleimide group), a condensable group (for example an amine, carboxylic acid, or alcohol group) or a chemically reactive group (for example an isocyanate, blocked isocyanate, carbodiimide, or epoxy group). Typical examples are the compounds of the following formulae

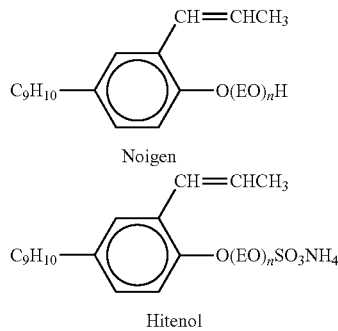

Noigen is available from DKS, Japan, and Hitenol is available from DKS Japan. Other suitable compounds are available from Uniquama under the trade name Maxemul. Use of reactive surfactant, in whole or in part, is an important way to induce nano-encapsulation of the complex oxide cathode material during or at the end of grinding process. In a specific embodiment of the invention, such additives are used only at the end of the grinding process to encapsulate nano-powder.

The above products which are industrial compounds, combined with a grinding process to lower particles sizes, allow optimization of the production of battery grade nano-size and submicron carbon coated complex oxide, in particular $LiFePO_4$, especially for high-power batteries, in term of cost-effectiveness, safety (low hazard, low VOC, . . . ). The organic precursors are preferably selected to form a thin nanoscale carbon deposit that will be intimately contacted to the complex oxide crystal structure, that will be at least partially graphitized during pyrolysis. The organic precursor may contain elements such as N, P, Si that may remain in the carbonaceous deposit after pyrolysis.

Optionally these organic precursors may be present in at least the gas phase in equilibrium with surface distributed organic precursor during the pyrolysis step and able to grow graphite or graphene layers on the surface of the metal phosphate. Optionnally, iron, cobalt or nickel catalyst can be present during the pyrolysis process to promote a conductive C deposit of graphene or graphitic nature. The metal catalyst may be introduced and distributed also as a metal containing surfactant such as Fe, Co or Ni stearate or oleate.

Preferably the nature, distribution and amount of organic precursor or the carbon deposit after pyrolysis are adjusted to avoid nanoparticle sintering (by carbon coating) or to control partial sintering with limited carbon quantities) on the complex oxide particles or in contrast to form interparticle carbon bridges at the nanoscale level.

Thermal treatment promotes sintering of primary nanoparticles inside an aggregate of nanoparticles, providing secondary particles. The size of said secondary particles is influenced by the nature of solvent, concentrations, organic precursor properties (adsorbed or not, for example) and thermal and pyrolysis processes. In some cases, the aggregates have some porosity or they are spherical if there is an important sintering for example. These aggregates might retain the primary nanoparticle shape or only an element of the nanoparticle like the C-deposit or some open or closed pores. Since the invention has shown that the shape and size of the complex oxide precursor is maintained if the particles are properly coated with a carbonaceous deposit, both the final synthesized product or the metal precursor can be processed.

The following examples are intended to illustrate the present invention more practically, but not to limit the invention in any way.

In all examples, each grinding experiment was performed using a wet grinding machine available from NETZSCH, Inc. under the trade name Netzsch LABSTAR (Z) model LABSTAR LS 1.

EXAMPLE 1

Synthesis

In first step, LiFePO4 was synthesized by melt casting using the process described in WO05.062404. 2 FePO4.2H2O and 1 Li2CO3 were mixed at nominal LiFePO4 composition with an excess of 0.5 mole of EBN-1010 (graphite powders), and then heated to 10500 C in a graphite crucible under inert atmosphere in a furnace. The melt was held at 10500 C for 1 h and then cooled down in the furnace. X-ray analysis has confirmed that the obtained ingot has a LiFePO4 main phase and minor Li4P2O7 and Fe2P2O7 phases as shown in curve a of FIG. 1. The impurity phase accounts for less than 3% of the total materials.

In a second step, the ingot was crashed into millimeter sized particles by using a jaw crusher with ceramic liner to avoid metal contamination. The millimeter sized particles are further ground by using ball milling to achieve micrometer sized particles. Finally, the micrometer sized powders were dispersed in IPA solution at 10-15% of solid concentration and then ground on a bead mill using 0.2 mm zirconia beads to achieve nanometer sized particles.

X-ray analysis shows that the olivine structure is still preserved, but the diffraction peaks become very broad due to small crystallite size as shown on curve b FIG. 1. The crystalline and microstrain calculated form the peak width are 30 nm and 2% respectively.

Figure 2:
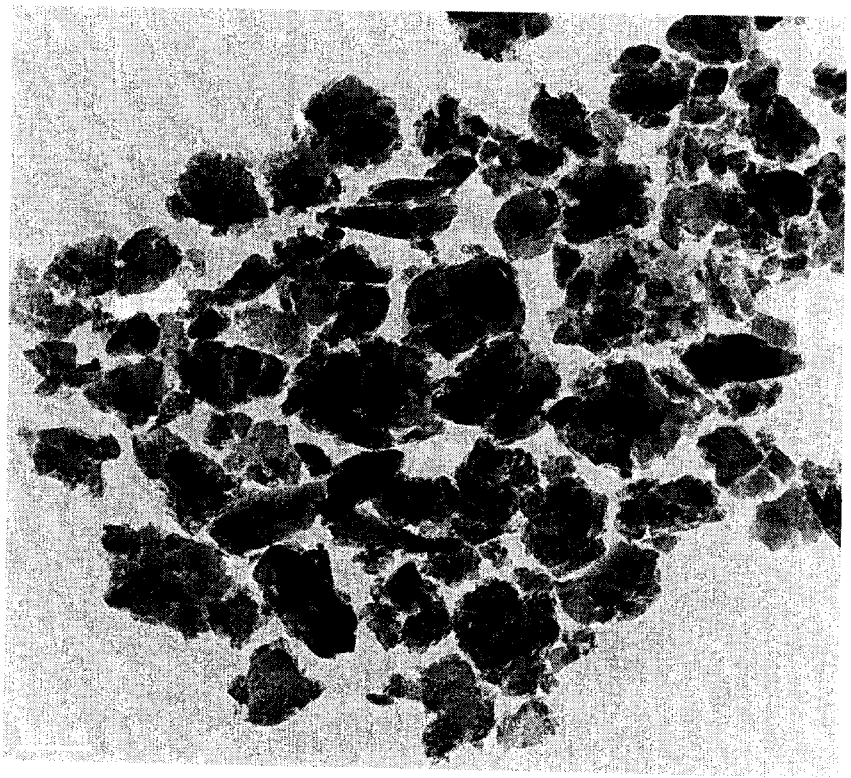
FIG. 2 illustrates a TEM micrography of ground agglomerated particles of the molten LiFePO4 after wet milling in IPA in TEM with a low magnification.
Figure 3:
FIG. 3 illustrates an agglomerated particle of FIG. 2 at high magnification showing 20-40 nm nanocrystallites reagglomerated from grinding and some alteration layer on the surface.
Figure 4:
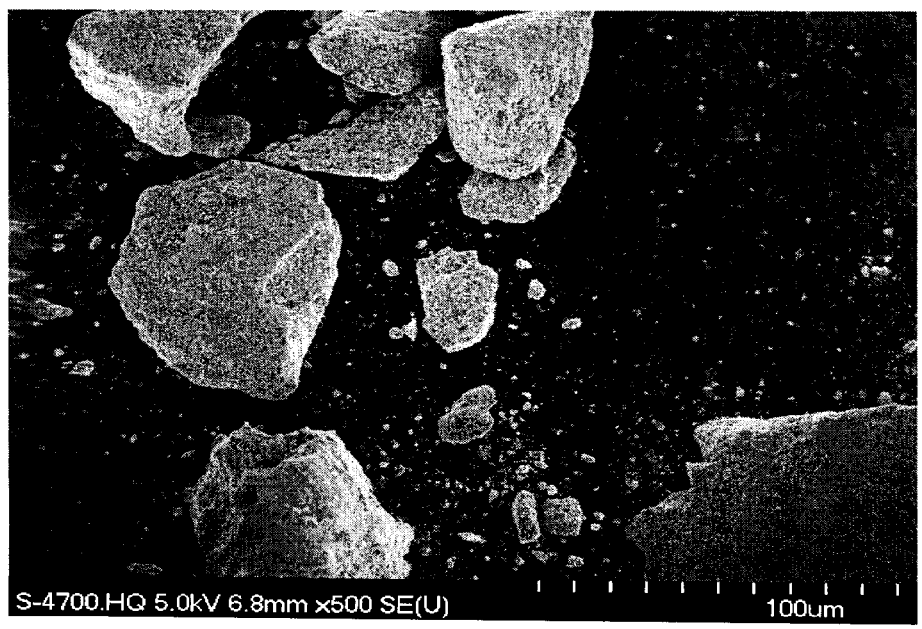
FIG. 4 is a SEM image of large secondary particles from nanogrinding in IPA after thermal treatment and pyrolysis.
Figure 5:
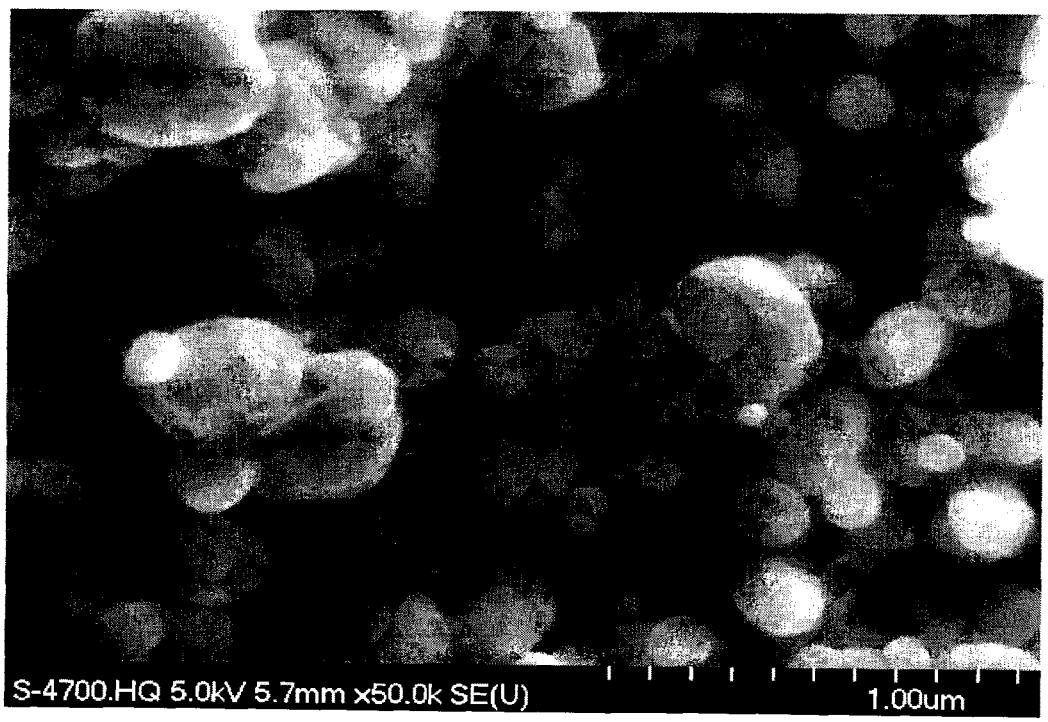
FIG. 5 is a SEM image representing a detail of the secondary particles of FIG. 4 at higher magnification with partially sintered nano-aggregates, carbon bridging and evidence of porosity in the secondary particles.

TEM observations show that wet milling leads to nanometer sized primary particles in the range of 20-30 am (FIG. 4) and these primary nanoparticles are re-agglomerated to submicron sized particles (FIG. 2, 3) in the range of 100-500 nm depending on the concentration of solid in liquid, the nature of the liquid media and the surfactant being used. There is a thin mechanically and chemically distorted surface layer on the particle surface (see FIG. 3).

In a third step, a solution of poly(maleic anhydride-1-alt-octadecene) dissolved in IPA is mixed with the LiFePO4 in IPA, in a ratio of 5 wt. % poly(maieic anhydride-1-alt-octadecene) over LiFePO4. The mixed solution was stirred thoroughly and then dried at room temperature by blowing with dry air while stirring.

In a final fourth step, the dried powder is heated to 7270 C at 6° C./min and held for 1 h 7270 C in a rotary kiln, and the cooled in a furnace at a cooling rate of 2° C./min. The heat treatment is protected by using argon flow. After said treatments, large aggregates of carbon coated nanoparticles having a diameter of 50-200 nm carbon are obtained. The pyrolytic carbon content is 1,4% measured by a C, S analyser LECO method. The product thus obtained is designated by C—LiFePO4.

Characterization

X-ray analysis (see curve c of FIG. 1) shows that the sintered product contains mainly LiFePO4 as a main phase with a small proportion OfFe2P2O7 minor phase. The diffraction peaks become sharper in comparison to that of the as-milled product due to grain growth and structure restoration through the thermal treatment. The crystallite size is about 190 am after thermal treatment. The strain is sharply reduced from 2% to 0.38%. SEM and TEM observations show that a thin layer of carbon deposition is formed on the nanoparticle surface and that the nanoparticles are bonded together by carbon-bridge forming aggregates showing evidence of open porosity (see FIG. 4, 5). The crystallite size of the thermal treated materials is roughly the same as the primary particle size. This indicates that the each primary particle is a single crystal after thermal treatment. TEM observation indeed confirm that each primary particle is single crystal.

C—LiFePO4, as prepared in the present example was used to prepare a cathode for a liquid electrode battery. C—LiFePO4, PVdF-HFP copolymer (from Atochem) and EBNIOIO graphite powder (from Superior Graphite) were thoroughly mixed in N-methyl pyrolidone (NMP) with zirconia balls for 1 hour on a turbula shacker, such as to obtain a 80/10/10 wt % proportion of the components. This slurry was then coated on a carbon-coated aluminum foil (from Intellicoat) with a Gardner coater, the coating was dried under vacuum at 800 C during 24 hours prior to storage in a glove box. A button type battery has been assembled and sealed in a glove box using the cathode thus obtained, a 25 µm microporous separator (from Celgard) impregnated with IM/1 LiPF6 salt in EC:DEC electrolyte and a lithium foil as anode.

Electrochemical measurement shows that the as-milled nano LiFePO4 with surface distortion layer gives very low electrochemical activity. Only 4% of reversible capacity was realized. In contrast, after the heat treatment under inert conditions and carbon deposition, 94% of reversible capacity was realized. The thermal treatment of the as-milled LiFePO4 is an essentiel step of the method to restore the structure and/or chemistry and to apply carbon deposition in order to achieve good electrochemical performance.

Figure 6:
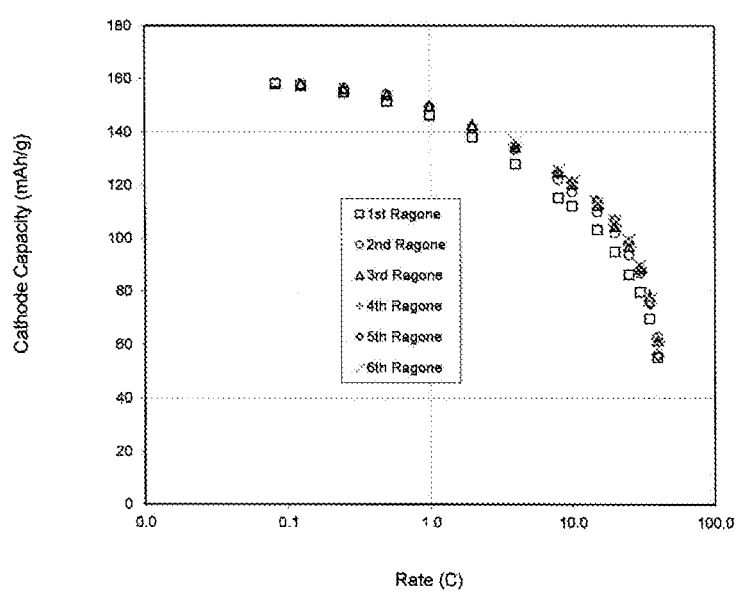
FIG. 6 represents a Ragone plot (niAh vs discharge rates) for the secondary particles of Example 1.

A Ragone plot as represented on FIG. 6 shows that the agglomerates of nanoparticles can deliver very high power at 10 C rate and confirms that a molten LiFePO4 ingot can lead to a high power material after grinding down to at a nano level (20-30 nm) more or less re-agglomerated, thermal treatment and pyrolysis of the organic precursor to make submicron composite particles made of carbon coated and carbon bonded nanoparticles.

EXAMPLE 2

A suspension in IPA of nanometer sized particles of LiFePO4 obtained after step 2 of Example 1 was dried at room temperature by blowing dry air. The obtained LiFePO4 was the re-dispersed in a water-lactose solution by using ultrasonic action. The ratio of lactose to LiFePO4 was 10 wt. %. After drying, lactose coated LiFePO4 particles are obtained.

Thermal treatment LiFePO4 and carbonization of the lactose were performed in a rotary kiln as described in example 1. SEM and TEM observation have revealed that the nanoparticles obtained after thermal treatment are bigger when lactose is used as the carbon precursor, even starting from te same wet milled particle precursors.

EXAMPLE 3

LiFePO4 was synthesized by a melt casting process and then milled to nanometer sized using a beads mill as described in example 1.

Poly(malic anhydride-1-alt-octadecene) was dissolved in IPA and then mixed with the LiFePO4 in an IPA suspension at a ratio of 5 wt %. After that, the solution was spray dried and spherical aggregates are obtained.

The spray dried aggregates containing LiFePO4 nanoparticles and Poly(malic anhydride-1-alt-octadecene) organic precursor were thermal treated in a rotary kiln as described in example 1.

Figure 7:
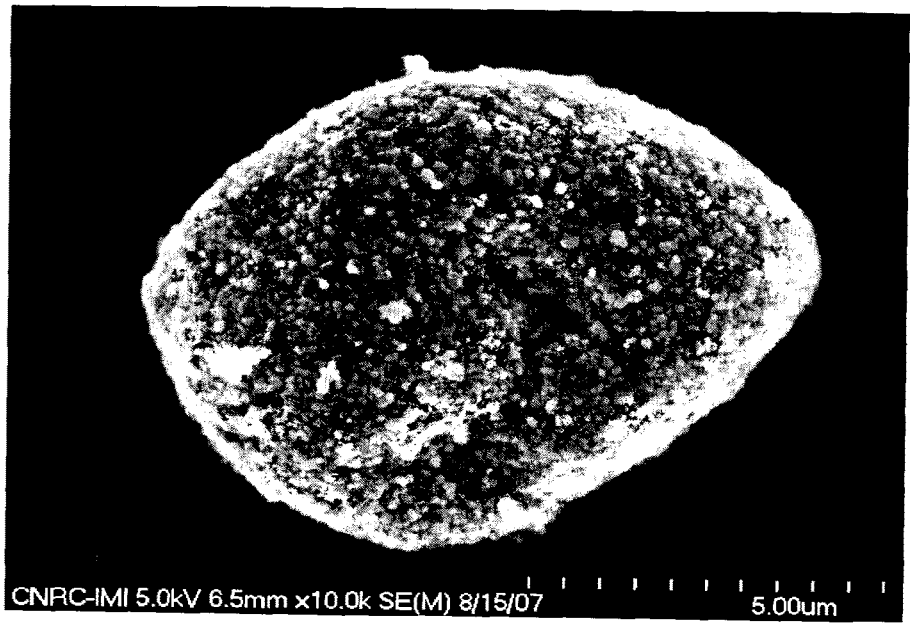
FIG. 7 is a SEM image of the sherical secondary particles (aggregates) obtained by spray drying in Example 3.
Figure 8:
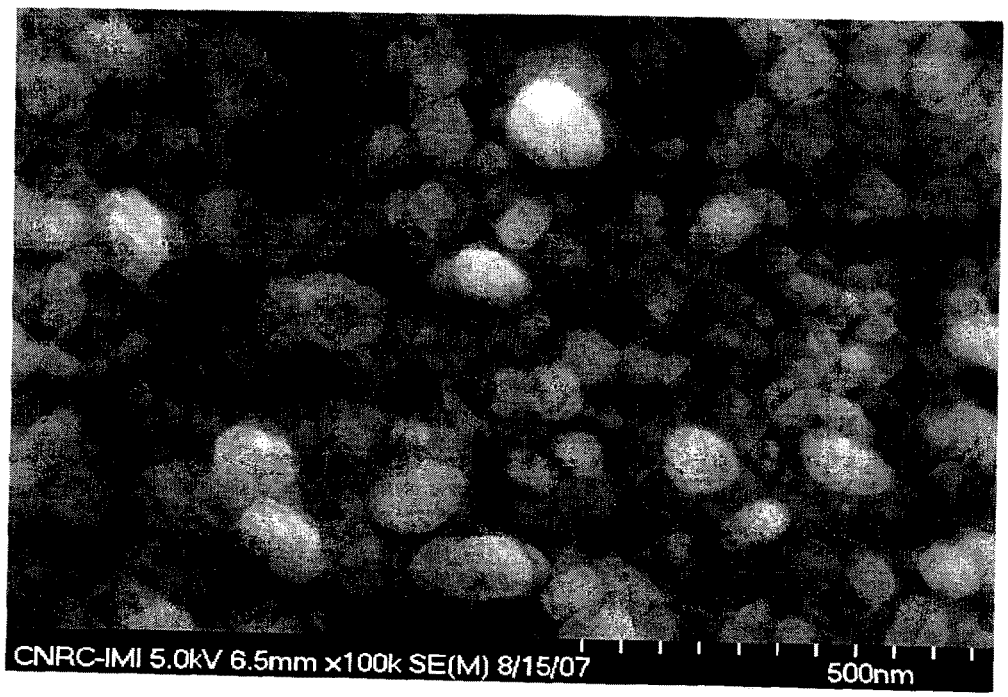
FIG. 8 is a SEM image of a detail of FIG. 7, representing nano-sized aggregated particles with evidence of porosity.

SEM analyses show that spherical micron sized C—LiFePO4 aggregates of nano particles are obtained (see FIGS. 7 & 8). A thin layer of conductive carbon is deposited on the suface of the nanoparticles.

EXAMPLE 4

LiFePO4 was synthesized by solid state reaction as described in WO-0227823. Stoichiometric amounts of FePO4.2H2O and Li2CO3 were mixed first, then added to an IPA solution premixed with Unithox 550 polymer solution. The ratio of polymer to Fe and Li precursor is 4.7%, The mixture was dried and then heat treated in a rotary kiln as described in example 1 (4th step). After cooling, a LiFePO4 with 1.7% carbon deposition (designated below by C—LiFePO4) was obtained. Unithox 550® consists of a hydrocarbon chain and a polyethylene oxide chain of a Molecular weight of ~1000 corresponding to formula $CH_3—(CH_2)_{37}—(CH_2CH_2O)_{12}—H$.

C—LiFePO$_4$ was dispersed in water at 20% of concentration and then milled in a beads mill as described in example 1. PSD analyses of the final milled products gives a D50 of 276 nm.

The wet milled product in water suspension was further mixed with lactose at different ratio of Lactose to LiFePO$_4$ and then heat treated in a rotary kiln as $4^{th}$ step of in example 1. Different carbon contents was achieved by adding various amount of lactose.

Figure 9:
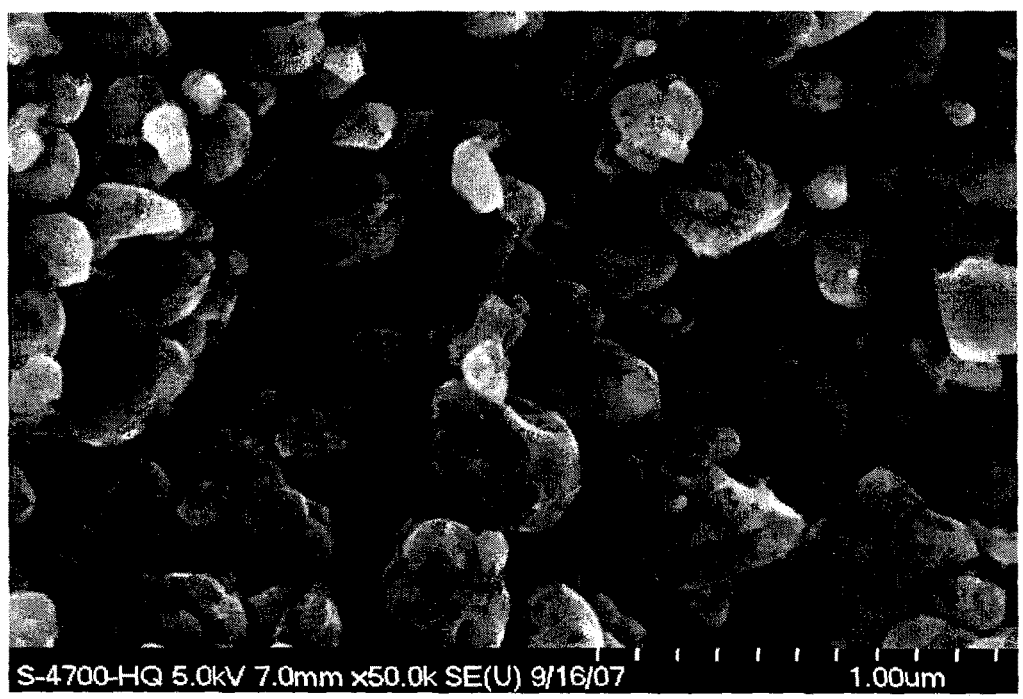
FIG. 9 is a SEM image of the aggregated 250-350 nm particles of example 4 using lactose and water.

SEM analyses indicates that nanoparticle size is in the range of 250-350 nm (see FIG. 9). This example shows that water can be used as a liquid carrier in the beads milling process.

EXAMPLE 5

A sample of nanoparticles of C—LiFePO$_4$ obtained after step 4 of example 1 is nanoground in IPA in the presence of a Triton X-100 surfactant agent. Proportions of the materials used are: 200 g C—LiFePO4, 1 g TritonX100 and 2b830 ml IPA.

Figure 10:
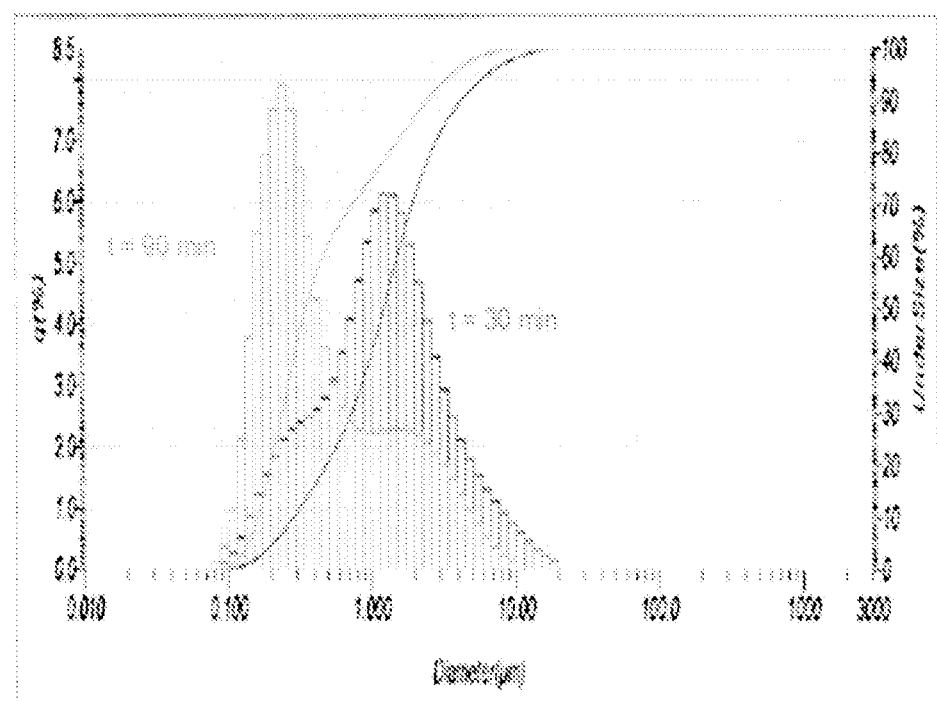
FIG. 10 illustrates a particle size distribution (PSD) vs time, C—LiFePO4 without, with Triton and Triton+Unithox 550 as per Example 5.

FIG. 10 illustrates the evolution of particle size vs time after 30 and 90 minutes. These results are also summarized in Table 1 hereunder.

TABLE 1

| Time/ | Particle size (µm) | | | |
|---|---|---|---|---|
| min | d10 | d50 | d90 | Comments on PSD |
| 30 | 0.2828 | 1.2108 | 4.250 | Large envelope of 2 peaks: large & smaller |

TABLE 1-continued

| Time/ min | Particle size (μm) | | | Comments on PSD |
|---|---|---|---|---|
| | d10 | d50 | d90 | |
| 60 | 0.2050 | 0.7330 | 5.155 | 1 peak and 2 small peaks |
| 90 | 0.1604 | 0.3470 | 2.483 | 1 peak + small peak |

After 30 min, a large flat envelope formed with a maximum around 3 μm (envelope and peaks at the left). At 60 min, the peaks envelope moved towards a smaller particle size with maximum between 1 μm and 0.3 μm. When the wet milling is extended to 90 min, a formation of well defined peak at 0.25 μm with small flat peak at 2 μm. The d50 was dropped from to 0.347 μm after 90 min in IPA. (envelope and peak at the right).

SEM and TEM examination are about the same as in example 1 confirming aggregates of nano sized crystals but with no strong benefit from the surfactant in the case of this already synthetized C—LiFePO$_4$ product by opposition to the much stronger effect observed with a material prepared from C—LiFePO4 precursors in the presence of a surfactant.

EXAMPLE 6

In this example a copolymer is used as the carbon precursor with a mixture of LiFePO4 precursors dispersed to form a slurry. The precursor adsoption on the solid particles is used to efficiently coat carbon on the surface of the LiFePO4 through the adsoption process.

A stoichiometric mixture or FePO4, 2H2O and Li2CO3 is dispersed, first mixed mechanically, and then progressively mixed with a Unithox 550 copolymere solution in IPA. Adsoption is confirmed by the fact that the remaining IPA solution does not contain significant amount of copolymer after mixing the slurry.

Figure 11:
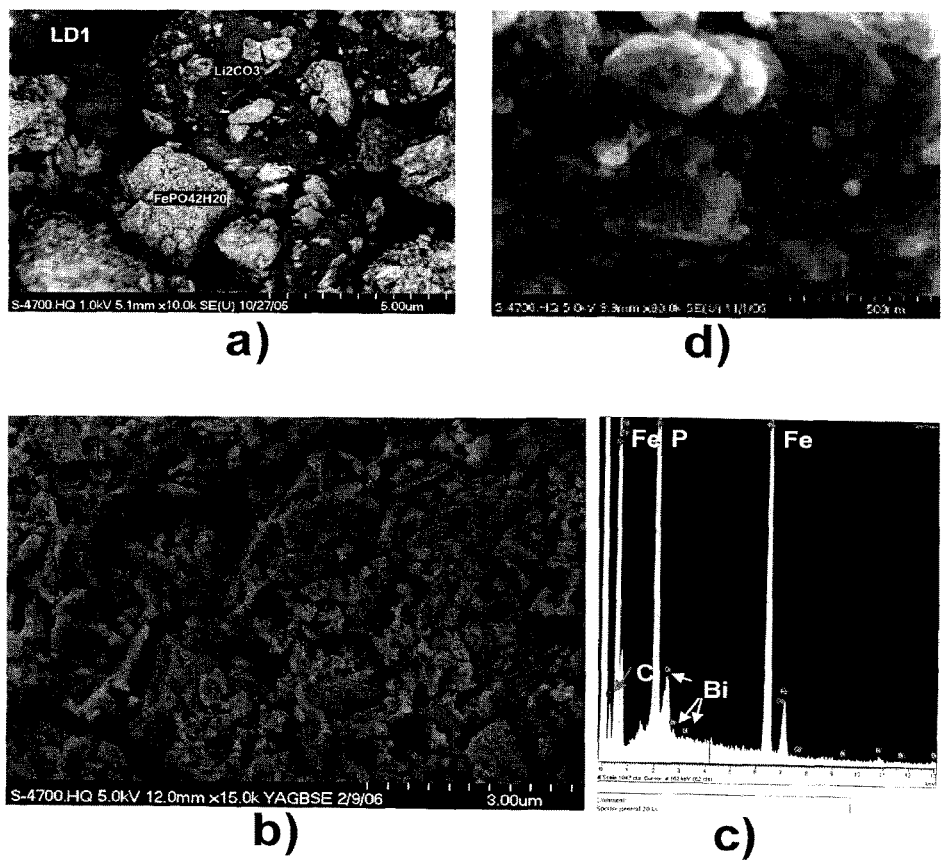
FIG. 11 represents:
a) a SEM image of the Li2CO3+FePO4 2H2O+Unithox copolymer precursor mixture of Example 6 showing the carbonate and the phosphate particles;
b) for a SEM image of an equivalent mixture on which the adsorbed copolymer is visible on the particles due to Bi complexation and visibility in SEM,
c) a SEM image equivalent to a) but after pyro lysis in which C deposit on LiFePO4 and C bridging are now visible
d) a RD-EDS diagram confirming the presence of Bi on all the surface.

FIG. 11 a is a SEM picture that shows the product mixture in which both FePO4, 2H2O particles and Li2CO3 can be distinguished in SEM because of the mass difference of the elements while the copolymer is not visible. On FIG. 11a, the carbonate and the phosphate are visible, but not the copolymer. On FIG. 11b, not only the carbonate and the phosphate are visible, but also the polymere with which the bismuth is complexed. A polymer film covers both the carbonate and the phosphate. FIG. 11d shows LiFePO4, carbon spots and carbon bridges resulting form pyrolysis of the organic carbon precursor that can be seen in low voltage SEM.

To reveal the polymer localization, a similar mixture has been dried and treated with a soluble bismuth sulfonate salt in IPA. In these conditions, the bismuth cation is complexed by the POE segment of the copolymer and insolubilized. Dried bismuth treated mixture is observed in SEM on FIG. 11b). At that point all particles are coated by the adsorbed copolymer and cannot be distinguished. Chemical analysis shows in FIG. 11c) that Bi is present on all particles surface revealing the thin adsorbed copolymer coverage of the mixed particles. This shows that the adsoption is very strong since a solution of Unithox in IPA in which FePO4 $^2$H2O powder is added will adsorb most of the copolymer and let only IPA solvent after one hour. Same phenomenon is observed in the same condition using LiFePO4 powder also in IPA.

Figure 12:
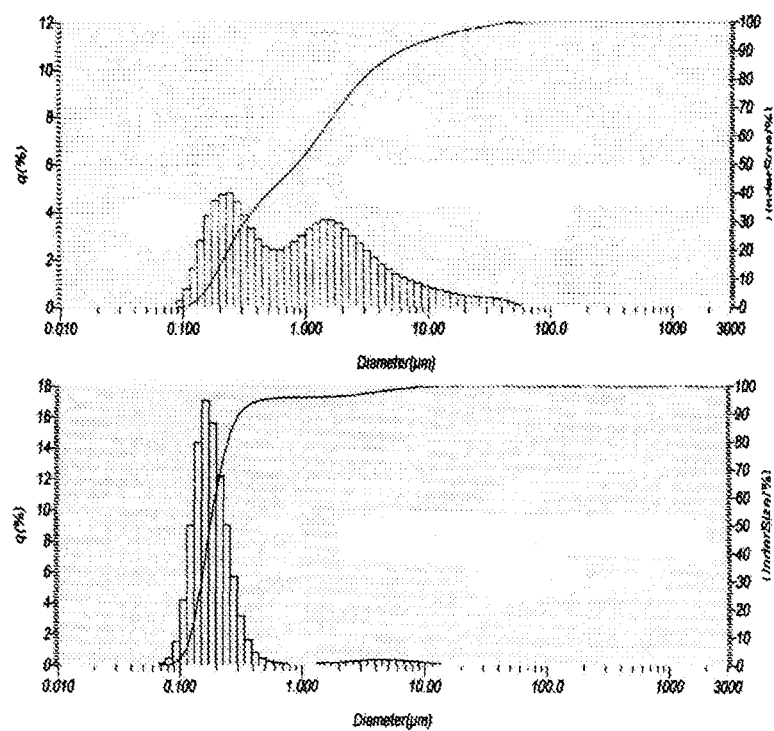
FIG. 12 is a representation of the apparent particle sized and distribution evolution upon wet grinding without, with Triton and Triton+Unithox copolymer from Example 7.

It is interesting to note in view of these observations, made on micron-sized particles for ease of observation, that upon heat treatment, at 7000 C of the mixture under inert or reducing atmosphere, the C-coated LiFePO4 (1.8% wt C) is formed with a high yield, >90%. Visualisation in SEM of the carbon coating is illustrated in FIG. 12d) at a higher magnification.

In a similar experiment, a stoichiometric mixture of FePO$_4$.2H$_2$O and Li$_2$CO$_3$ is nanoground in a bead mill with IPA as carrier solvent in presence of Unithox 550® copolymer. Adsorption has been confirmed by the fact that the remaining IPA solution does not contain a significant amount of copolymer after nanogrinding the slurry. After Bismuth treatment, chemical analysis have shown that Bi is present on all particles surface revealing the thin adsorbed copolymer coverage of the mixed particles. This shows that the adsorption is very strong since a solution of Unithox 550® in IPA in which FePO$_4$.2H$_2$O powder is nanogrind will adsorb most of the copolymer and let only IPA solvent after one hour.

EXAMPLE 7

This example illustrates the method of the invention, starting from C—LiMPO$_4$ precursors.

Samples were produced, starting from 200 g of a FePO$_4$.2H$_2$O+Li$_2$CO$_3$ stoichiometric mixture in 2830 ml of IPA. The particle sizes of the starting precursors are as follows

| | Initial particle size (μm) | | |
|---|---|---|---|
| | d10 | d50 | d90 |
| FePO4: | 0.878 | 2.9 | 5.5 |
| Li2CO3 | 1.74 | 3.64 | 6.16 |

The particle size of the final product is studied as a function of grinding time.

In the first case, the reaction mixture only contains IPA and the precursors. In the second case the reaction mixture contains additionally Triton 100X, (0.5% wt to solids). Triton is a surfactant which contains only C, H and O elements and is used to help make nanoparticles or small agglomerates. In the third case, the reaction mixture contains additionally a Unithox 550 copolymer (4.7% wt to solid).

Results are summarized in the following tables showing that after 90 minutes, the Triton X100 surfactant has a favourable effect on grinding and PSD with a nearly monomodal D50 of 200 nm versus a remaining bimodal PSD when no additive is used.

Furthermore the addition of a Unithox copolymer leads to a well defined monomodal PSD and a D50 of about 180 nm. Also a better fluidity of the circulating slurry with Triton is observed. The fluidity is much better when both Triton and Unithox are used.

Unithox 550 polymer as a carbon precursor was added to the precursor milled with 0.5% Triton surfactant in the ratio of 4.7% polymer over ion phosphate and lithium carbonate precursor. The precursor with polymer additive was dried slowly while stirring and then heat treated in a rotary kiln as described in example 1 under argon.

Figure 13:
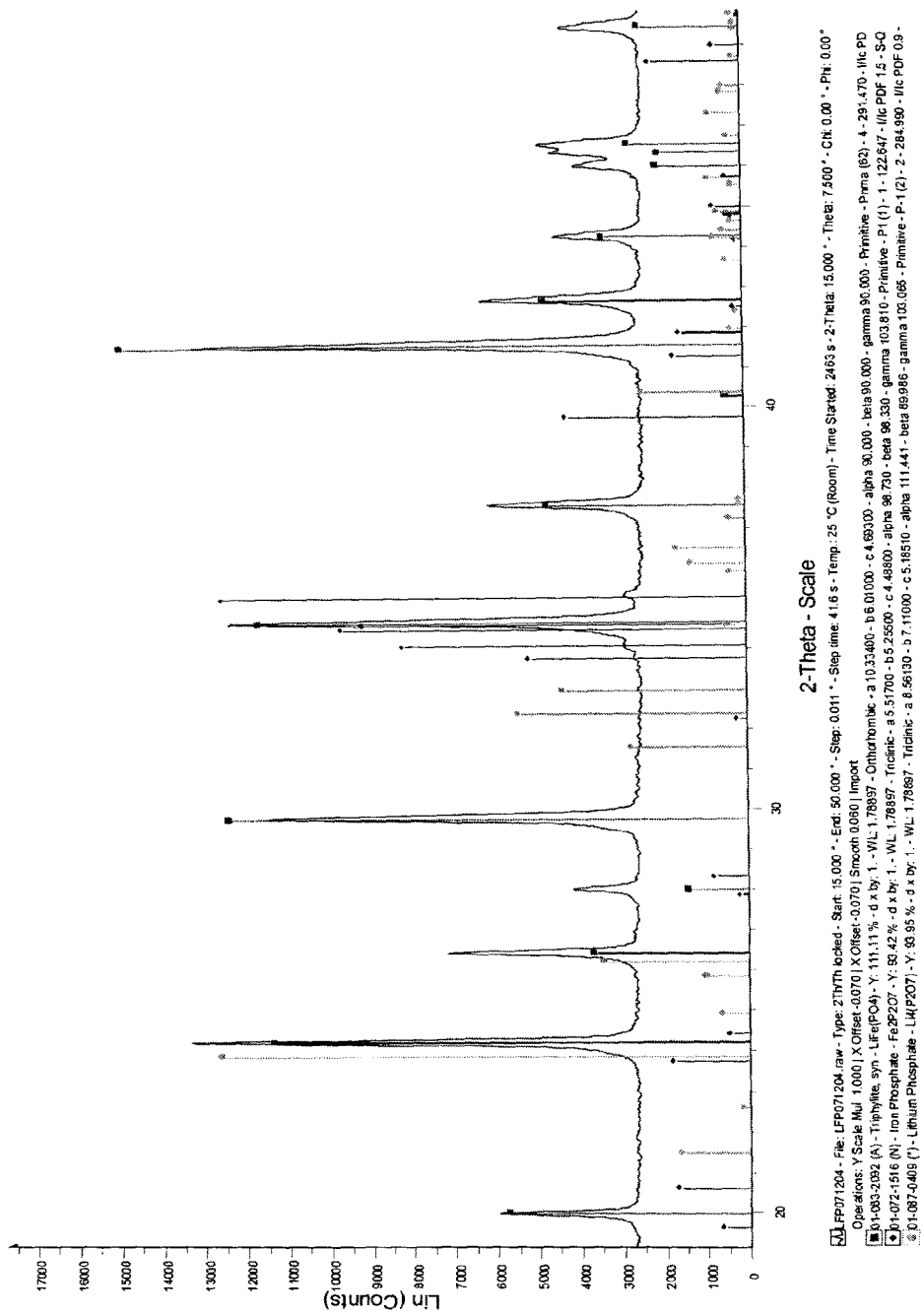
FIG. 13 is a SEM image of C-deposited nanostructured LiFePO4 of Example 7 after pyrolysis.

X-ray analyse shows that the final product is LiFePO$_4$ with about 3-4% of Fe$_2$P$_2$O$_7$ impurity phase (see FIG. 13). The crystallite size calculated from peak width is 300 nm and the microstrain is 0.68%.

Figure 14:
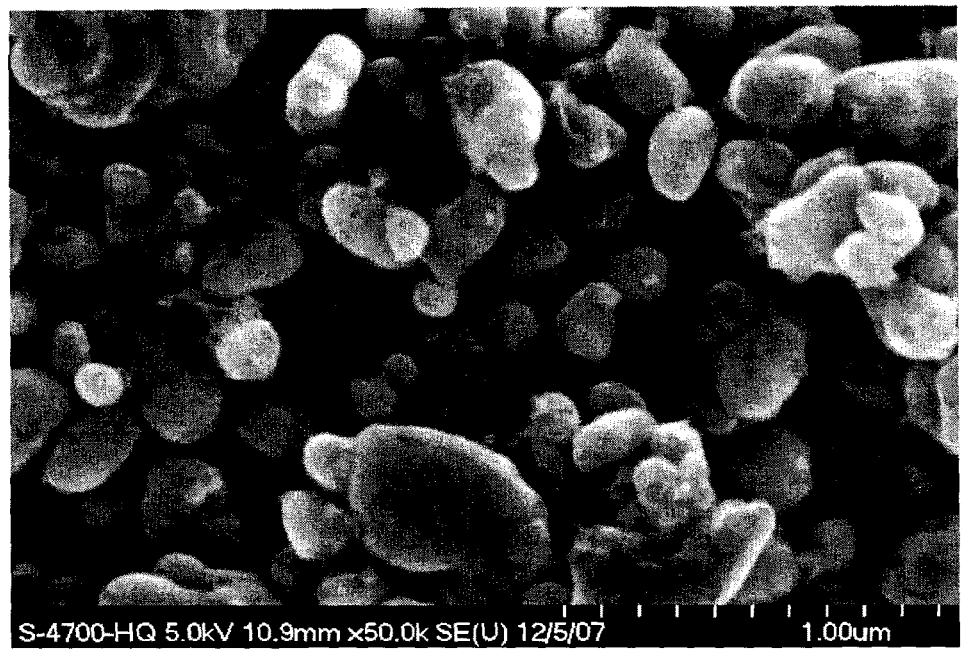
FIGS. 14 and 15 are SEM images of C-LiFePO4 aggregated particles (200-500 nm) obtained after nanogrinding a Li2CO3+FePO4 2H2O mixture with Triton as a surfactant (FIG. 14) and without surfactant (FIG. 15) and pyrolysis at 700° C. in the presence of Unithox and IPA.
Figure 15:
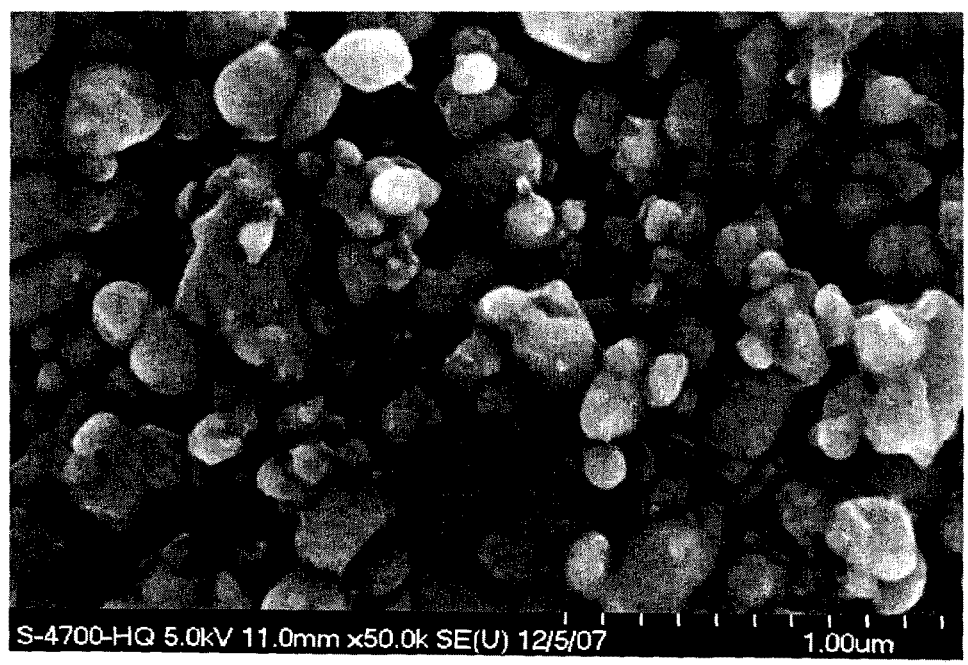

FIGS. 14 and 15 are SEM images of C—FePO$_4$ particles (200-500 nm) as partially spherical aggregates obtained after nanogrinding a Li$_2$CO$_3$+FePO$_4$ 2H$_2$O mixture with Triton as a surfactant (FIG. 14) and with surfactant (FIG. 15) and pyrolysis at 700° C. in the presence of Unithox and IPA.

SEM observation shows aggregates made of from nanoparticles size is in the range of 200-500 nm A majority of the naoparticles have particle size in the range of 200-300 nm. Carbon deposition can also be observed. LECO measurement shows that the carbon content is 1.87 wt. %. This is slightly higher than the carbon content of 1.6-1.7 wt. % of carbon when no Triton is added during processing. It is anticipated that the Triton surfactant is absorbed on the particle surface and carbonized in the thermal treatment. But Triton alone does not yield much carbon.

Wet gringing all precursors together can also solve the mixing problem for fine particles. As is known, it is very difficult to mix submicron sized precursor particles together by conventional mixing method. Wet milling could achieve fine particle reactants and homogeneous mixing of the reactants, and then C—LiFePO$_4$ product with higher purity is expected after synthesis as desmonstrated in the present example.

Overall, surfactant and copolymer addition during the wet grinding have improved processability and lead to fine and monodispersed particles, probably more than C—LiFePO$_4$ wet grinding. Polymer adsorption shown in Example 6 might have contributed to processability in addition to help to the carbon deposition process.

FePO$_4$+Li$_2$CO$_3$

| Time/ | Particle size (µm) | | | |
|---|---|---|---|---|
| min | d10 | d50 | d90 | Comments on PSD |
| 30 | 0.1315 | 0.2182 | 4.119 | 2 peaks: large & smaller |
| 60 | 0.1451 | 0.3334 | 18.23 | 1 peak and 2 small peaks |
| 90 | 0.1186 | 0.1727 | 0.4044 | 1 peak + small peak |

FePO$_4$+Li$_2$CO$_3$+0.5% Triton X-100

| Time/ | Particle size (µm) | | | |
|---|---|---|---|---|
| min | d10 | d50 | d90 | Remark |
| 30 | 0.1916 | 0.8539 | 5.1675 | 2 equal peaks |
| 60 | 0.141 | 0.2479 | 1.6525 | 1 peak and 1 small peak |
| 90 | 0.1279 | 0.1987 | 0.4447 | 1 peak and 1 very small |

FePO$_4$+Li$_2$CO$_3$+0.5% Triton X-100+Unithox 550

| Time/ | Particle size (µm) | | | |
|---|---|---|---|---|
| min | d10 | d50 | d90 | Remark |
| 30 | 0.1754 | 0.8512 | 6.1164 | 2 equal peaks |
| 60 | 0.1410 | 0.2740 | 20.1855 | 1 peak and 2 small peaks |
| 90 | 0.1211 | 0.1771 | 0.3064 | 1 peak |

The invention claimed is:

1. A method for improving the electrochemical performance of previously synthesized lithium metal phosphate particles, said method comprising:
    grinding said previously synthesized lithium metal phosphate particles into a particle size of from 5 nm to less than 1 micron, wherein the grinding is performed in a bead mill on particles dispersed in a carrier solvent, and such that:

$0.004 < MS(SP)/MS(B) < 0.12$, $0.0025 < MS(FP)/MS(SP) < 0.25$ wherein MS(SP) represents the mean size diameter of the particles before grinding, MS(FP) represents the mean size diameter of the particles after grinding, and MS(B) is the mean size diameter of the beads;
    adding an organic carbon precursor to the particles before, during or after said grinding; and
    performing a pyrolysis on the organic carbon precursor and ground particles to obtain a non-powdery conductive carbon deposit on at least part of the surface of the particles,
    wherein said organic carbon precursor is a monomer, said method comprising a further step performed after said grinding and before said pyrolysis, said further step being polymerizing or cross-linking the organic carbon precursor.

2. The method of claim 1, wherein the carrier solvent is water or isopropanol.

3. The method of claim 1, said method comprising a further step performed before said pyrolysis, said further step being aggregating the organic carbon precursor and the ground particles.

4. The method of claim 3, wherein said aggregating is performed by flocculating, by spray drying, or by charge effect.

5. The method of claim 1, wherein the mean size diameter of the beads is from 100 µm to 500 µm.

6. The method of claim 1, said method comprising a further step performed before said grinding, said further step being adding an organic stabilizing agent to said previously synthesized lithium metal phosphate particles.

7. The method of claim 6, wherein the organic stabilizing agent is selected from the group consisting of organic electrostatic or electrosteric stabilizers, surfactants, dispersant agents, self-adsorbing agents, and encapsulating agents.

8. The method of claim 6, wherein the organic stabilizing agent is a conductive carbon precursor.

9. The method of claim 1, wherein the particles before said grinding have a size of from 1 µm to 50 µm.

10. The method of claim 1, wherein the previously synthesized lithium metal phosphate particles have an olivine structure, and wherein:
    lithium is optionally partly replaced with not more than 10 atomic % Na or K;
    the metal is Fe$^{II}$ or Mn$^{II}$ and is optionally partly replaced with not more than 50 atomic % of at least one metal selected from the group consisting of Mn, Fe, Ni and Co, and optionally replaced with not more than 10 atomic % of at least one aliovalent or isovalent metal different from Fe, Mn, Ni or Co; and
    phosphate is optionally partly replaced with not more than 10 mol % of at least one group selected from SO and SiO$_4$.

11. The method of claim 10, wherein the aliovalent or isovalent metal different from Fe, Mn, Ni or Co is at least one metal selected from the group consisting Mg, Mo, Nb, Al, Ta, Ge, La, Y, Yb, Sm, Ce, Hf, Cr, Zr, Bi, Zn, Ca and W.

12. The method of claim 1, wherein the previously synthesized lithium metal phosphate particles have the formula LiFe$_{1-x}$Mn$_x$PO$_4$, wherein $0 \leq x \leq 0.5$, or LiMnPO$_4$.

* * * * *